(12) United States Patent
Moffatt et al.

(10) Patent No.: US 6,323,257 B1
(45) Date of Patent: *Nov. 27, 2001

(54) INK-JET INK COMPOSITIONS CONTAINING REACTIVE MACROMOLECULAR CHROMOPHORES FOR DIGITAL AND TEXTILE PRINTING

(75) Inventors: John R Moffatt; Joseph W Tsang, both of Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/298,626

(22) Filed: Apr. 23, 1999

(51) Int. Cl.⁷ .............................. C09D 11/02; C09D 11/10
(52) U.S. Cl. ..................... 523/160; 523/161; 106/31.6
(58) Field of Search ........................... 523/160, 161; 106/31.6, 31.64, 31.85, 31.89, 31.27, 31.28, 31.75, 31.77, 31.78

(56) References Cited

U.S. PATENT DOCUMENTS

| | | | | |
|---|---|---|---|---|
| 4,381,185 | * | 4/1983 | Swanson et al. ................... 8/506 |
| 4,664,708 | * | 5/1987 | Allen ................... 106/31.46 |
| 5,176,745 | * | 1/1993 | Moore et al. ................... 106/31.27 |
| 5,922,118 | * | 7/1999 | Johnson et al. ................... 106/31.6 |
| 5,928,419 | * | 7/1999 | Uemura et al. ................... 106/493 |
| 5,935,309 | * | 8/1999 | Moffatt et al. ................... 106/31.27 |
| 5,952,429 | * | 9/1999 | Ikeda et al. ................... 525/326.1 |
| 5,969,033 | * | 10/1999 | Pearlstine ................... 524/502 |
| 5,969,112 | * | 10/1999 | Feeman et al. ................... 534/604 |
| 5,972,544 | * | 10/1999 | Carr et al. ................... 430/7 |
| 6,056,811 | * | 5/2000 | Shimomura et al. ............. 106/31.36 |
| 6,059,870 | * | 5/2000 | Taylor et al. ................... 106/31.43 |
| 6,132,502 | * | 10/2000 | Yatake ................... 106/31.86 |

* cited by examiner

Primary Examiner—Vasu Jagannathan
Assistant Examiner—Callie E. Shosho
(74) Attorney, Agent, or Firm—Micheal D. JOnes

(57) ABSTRACT

The present invention relates to ink-jet ink compositions that comprise modified pigment particles (macromolecular chromophores) having functional groups covalently attached for water solubility and reactive moieties covalently attached to the pigments. MMC with such reactive moieties attached can either a) react directly with cellulose or other textile material or, b) can participate in polymerization reactions. These reactive moieties may in turn be further derivatized to provide the desirable attribute, such as enhanced smearfastness, enhanced print quality, improved bleed control, and improved resistance to water when applied to the media. Moreover, inks formulated with these reactive MMCs demonstrate viscosity and surface tension characteristics that are useful in ink-jet printing. This includes thermal ink jet, piezoelectric ink jet, and continuous ink jet printing.

26 Claims, 1 Drawing Sheet

R₁ = Water Solubilizing Groups

R₂ = Reactive Groups

R₃ = Polymeric Groups to Provide Desired Benefit

INK-JET INK COMPOSITIONS CONTAINING REACTIVE MACROMOLECULAR CHROMOPHORES FOR DIGITAL AND TEXTILE PRINTING

TECHNICAL FIELD

The present invention relates to ink-jet ink compositions that comprise modified pigment particles (macromolecular chromophores) having both functional groups attached for water solubility and reactive moieties attached to the pigments. These reactive moieties may in turn have various substituents attached to them to provide the desirable attribute, such as enhanced smearfastness, enhanced print quality, improved bleed control, and improved resistance to water when applied to the media. Moreover, these inks formulated with these reactive MMCs demonstrate good viscosity and surface tension and are useful in ink-jet printing, including thermal ink jet printing, piezoelectric ink jet printing, and continuous ink jet printing.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

On operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Ink-jet inks used in thermal ink-jet printing typically comprise a colorant and a vehicle, with the vehicle often containing water and other relatively low surface tension liquids.

There are two general classifications of colorants: dye-based and pigment-based. Dyes have the advantage of being water-soluble. However, problems with dyes include poor waterfastness, poor smearfastness, poor bleed control between colors, and poor lightfastness. Pigments are generally not soluble in water and require a dispersant or other means to make it soluble in water.

Although the relevant art contains many examples of ink-jet ink formulations using these colorants, a need still exists for ink compositions comprising stable, water soluble pigments which provide improved smearfastness, waterfastness, improved print quality, improved bleed control, and optical density.

SUMMARY OF INVENTION

Figure 1:
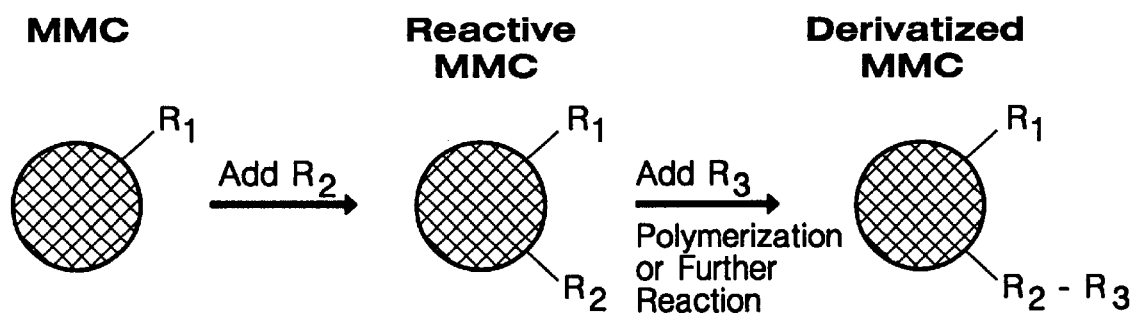
FIG. 1 is a schematic of the steps leading to formation of the MMCs of this invention with water solubilizing groups ($R_1$) and reactive groups covalently attached ($R_2$), and wherein the reactive group is either attached to polymers by polymerization reaction or react directly with cellulose and textile materials.

In accordance with the invention, an ink-jet ink composition is provided which comprises a colorant that is both water-soluble and also contains reactive sites attached to the colorant. The colorants used herein comprise pigment particles, the surface of which is treated with covalently linked functional groups to provide water solubility as well as covalently linked polymers to give exceptional properties in an ink formulation. Such treated pigments are called macromolecular chromophores (MMC). Inks comprising these MMCs are very effective in reducing smear and have increased waterfastness, bleed control, optical density and improved print quality. Bleed control is defined as the invasion of one colored ink printed substantially, simultaneously and adjacently to a second colored ink. The ink may contain further components to aid in providing improved print quality and performance in an ink-jet printer.

Additionally, a method of ink-jet printing that uses the disclosed inks and exploits the ink's properties is provided.

All concentrations herein are in weight percent, unless otherwise indicated. The purity of all components is that employed in normal commercial practice for ink-jet inks. All references and cited patents are hereby incorporated by reference.

DETAILED DESCRIPTION OF THE INVENTION

The pigment particles, or MMCs, for use in the present ink formula comprises chemical modifications to impart water solubility to the pigment. Under typical chemical processes, the resulting surface of the MMC consists of carboxylate, phosphate, and/or sulfonate functionalities for anionic chromophores, and ammonium, quaternary ammonium, or phosphonium functionalities for cationic chromophores.

The MMC colorant particles of the present invention preferably have a useful mean diameter ranging from 0.005 to 12 um. Colorants of this type result from chemical reactions where solvent-accessible functional groups are derivatized to provide solubilizing groups that render the colorant soluble in water. The resulting macromolecular chromophore (MMC) is water-soluble, with its solubility being similar to that of well-known, commercially used water-soluble acidic and basic dyes.

These water-soluble black chromophores are made from commercially available pigments obtained from colorant vendors such as Cabot Corp. and Orient Chemical. Many pigments are useful in the practice of this invention. The following pigments comprise a partial list of useful colorants in this invention.

Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140, are all available from BASF Corp.

The following pigments are available from Cabot: Monarch® 1400, Monarch® 1300, Monarch® 1100, Monarch® 1000, Monarch® 900, Monarch® 880, Monarch® 800, and Monarch® 700.

The following pigments are available from Ciga-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B.

The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from Dupont. The following pigments are available from Heubach: Dalamar® Yellow YT-858-D and Heucophthal® Blue G XBT 583D. The following pigments are available from Hoechst: Permanent Yellow GR, Permanent Yellow G, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostapermg Yellow H4G, Hostaperm® Yellow H3G, Hostaperm® Orange GR, Hostaperm® Scarlet GO, and Permanent Rubine F6B. The following pigments are available from Mobay: Quindog Magenta, Indofast® Brilliant Scarlet, Quindo® Red R6700, Quindo® Red R6713, Indofast® Violet. The following pigments are available from Sun Chem: L74-1357 Yellow, L75-1331 Yellow, and L75-2577 Yellow.

Modification imparting Water-solubility—The MMCs herein are modified by the addition of one or more organic groups comprising at least one aromatic group or a one to twelve carbon containing alkyl group and at least one ionic group or ionizable group. The ionizable group is one that forms in ionic groups in the aqueous medium. The ionic group may be anionic or cationic. The aromatic groups may be further substituted or unsubstituted. Examples include phenyl or a napthyl groups and the ionic group is sulfonic acid, sulfinic acid, phosphonic acid, carboxylic acid, ammonium, quaternary ammonium, or phosphonium group.

Depending on the process selected, the MMC can either be anionic or cationic in character. Commercially available anionic chromophores are usually associated with sodium or potassium ions, and the cationic chromophores are usually associated with chloride or sulfate ions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid and metanilic acid.

Ammonium, quaternary ammonium groups, quaternary phosphonium groups, and protonated amine groups represent examples of cationic groups that can be attached to the same organic groups discussed above.

FIG. 1 shows the formation of the MMCs wherein water solubilizing groups ($R_1$) are attached. Other examples of groups attached to the MMC to provide water-solubility are shown below:

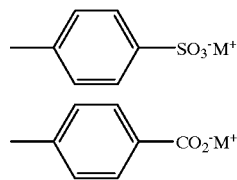

-continued

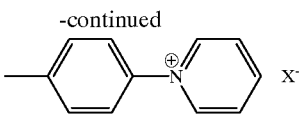

wherein $X^-$ and $M^+$ are counterions.

See U.S. Pat. Nos. 5,707,432; 5,630,868; 5,571,311; and 5,554,739 for a discussion of modified carbon black pigments and methods of attaching the functionalized groups.

Second Modification: Adding Reactive Sites to MMCs—After addition of water-soluble functional groups, the MMCs are further modified by covalently attaching reactive groups to provide the various printing attributes that the ink formulator desires.

As can be seen in FIG. 1, a schematic of the steps leading to formation of the MMCs of this invention shows that after attachment of the water solubilizing groups ($R_1$), the reactive groups ($R_2$) can be reacted with the MMC to produce sites on the MMC on which further groups can be added.

Suitable reactive ($R_2$) are, therefore, covalently attached to the surface of the MMC as shown below:

1. Phenyl triazines

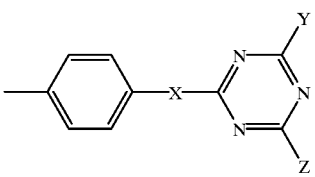

X = O, S, SO$_2$, NH
Y or Z = H, Cl, F, Br

2. Phenyl 2-(methyl ethyl sulfanato) ether, phenyl 2-(methyl ethyl sulfanato) sulfide, phenyl 2-(methyl ethyl sulfanato) sulfone, N-phenyl-N-2-(methyl sulfanato)ethyl amine

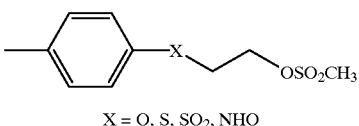

X = O, S, SO$_2$, NHO

3. Sodium phenyl 2-(ethyl sulfanato) ether, sodium phenyl 2-(ethyl sulfanato) sulfide, sodium phenyl 2-(ethyl sulfanato) sulfone, N-phenyl-2-(ethyl sulfanato)ethyl amine

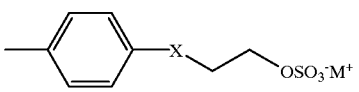

X = O, S, SO$_2$, NHO
$M^+$ = Na$^+$, K$^+$, NH$_4^+$, (CH$_3$)$_2$NH$_2^+$, (CH$_3$)$_4$N$^+$, (C$_4$H$_9$)$_4$N$^+$, (C$_3$H$_7$)$_4$N$^+$, etc 4. Chloromethyl (ethyl) phenyl sulfone, 2,2-dichloroethyl phenyl sulfone

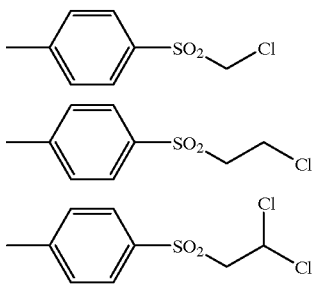

5. Phenyl vinyl sulfone

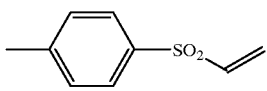

6. N-Phenyl vinyl amide, phenyl-(2-chloroethyl)amide, amino 2-ethyl chloride

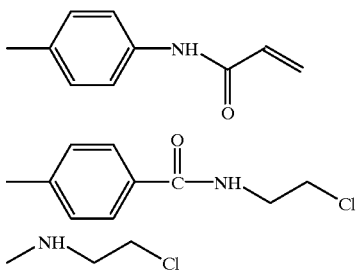

and mixtures thereof.

In the presence of dilute base and/or sterically hindered amines these reactive groups are capable of reacting with the sugar residues on cellulose, thus covalently linking the MMC to the paper fibers. (As recognized in the art of the textile industry, treatment of cellulose with reactive dyes affords permanent attachment of the dye to the textile material.) Alternatively, when covalently attached to the MMC, these reactive groups provide a convenient means by which polymers can be attached or participate in polymerization reactions.

The MMC disclosed and claimed herein may comprise from about 0.001 to about 10 mmole/g total of covalently attached water solubilizing groups and covalently attached reactive group. Covalently attached polymeric compositions consisting of one or more monomers (shown below) in any relative proportion may then be attached to the reactive group.

Polymer Attachment—Use of the above chromophores which already have the reactive groups covalently attached to the MMC allows for polymerization in water. The placement of the above group(s) on the MMC also allows for covalent attachment of the polymer at specific sites rather than nonspecific non-covalent adsorption onto the MMC surface. Suitable polymerization processes for use in this invention include solution, emulsion, or suspension methods. The radical chain polymerization occurs at the reactive group on the MMC surface to form a variety of polyacrylates, polymethacrylates, and other homo- or co-polymers. Thus, the polymers are covalently attached to the MMC, not merely associated with the colorant particle by van der Waals or London dispersion forces. Thus, unlike typical pigment-based inks, the ink formulations herein are substantially free (less than 0.005 wt %) of traditional dispersants which provide water-solubility by noncovalently adsorbing or otherwise physically associating with the colorant particle.

Suitable monomers which can be used in the polymerization process include esters of 50 carbons or less of acrylic and methacrylic acids; amides of 50 carbons or less of acrylic and methacrylic acids; alkyne glycols and their ethers derived from acrylic and methacrylic acids; vinyl pyrrolidone, vinyl carbazole, vinyl acetate and alcohols, allyl acetate, and all isomers of amino and sulfonic acides of styrene. The polymerization process usually continues until no free monomer is observed in the reaction mixture. A person skilled in the art will recognize that verification can be confirmed of the absence of free monomer, for example, by gas chromatogram. The average molecular weight of the polymers used herein is from about 300 to about 100,000, preferably from about 5,000 to about 30,000. The MW of the polymer is determined from the MW of the free polymer polymerized in the absence of the MMC. It is assumed that the MW of the free polymers is the same as when attached to the MMC.

One or more of the following monomers may be added in any combination and in any ratio.

Structures of suitable vinyl monomers are listed below.

| Acrylic and methacrylic acids, and the salt form | 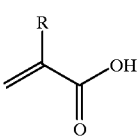 | R = H (acrylic acid) or CH3 (methacrylic acid) |
|---|---|---|
| Esters of acrylic and methacrylic acids | 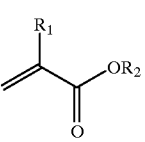 | $R_1$ = H (acrylic acid) or $CH_3$ (methacrylic acid)<br>$R_2$ = radical of 1–50 carbon |

-continued

| | | |
|---|---|---|
| Amides of acrylic acid | 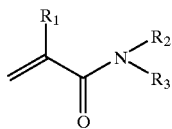 | $R_1$ = H (acrylic acid) or $CH_3$ (methacrylic acid)<br>$R_2$ and $R_3$ = H or radical of 1–50 carbon |
| Hydroxy amides of acrylic and methacrylic acids | 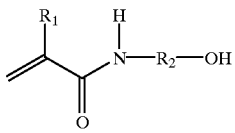 | $R_1$ = H (acrylic acid) or $CH_3$ (methacrylic acid)<br>$R_2$ = radical of 1–50 carbon |
| Polyethylene glycols and ethers of acrylic acid | 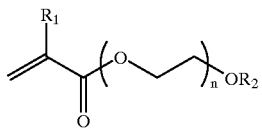 | $R_1$ = H (acrylic acid) or $CH_3$ (methacrylic acid)<br>$R_2$ = H or radical of 1–50 carbon<br>n = 1–100 repeat units |
| Polyalkylene glycols and ethers of acrylic acid | 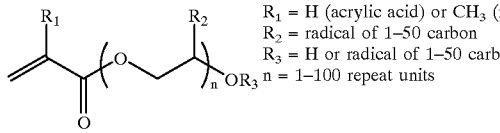 | $R_1$ = H (acrylic acid) or $CH_3$ (methacrylic acid)<br>$R_2$ = radical of 1–50 carbon<br>$R_3$ = H or radical of 1–50 carbon<br>n = 1–100 repeat units |
| Sulfoalkyl(aryl) acrylate and methacrylate, and their salt form | 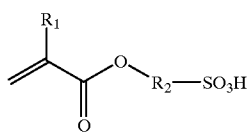 | $R_1$ = H (acrylate), or $CH_3$ (methacrylate)<br>$R_2$ = radical of 1–50 carbon |
| Stryene and its derivatives | 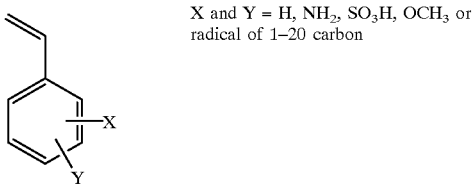 | X and Y = H, $NH_2$, $SO_3H$, $OCH_3$ or radical of 1–20 carbon |
| Vinyl ether | 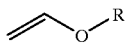 | R = radical of 1–50 carbon |
| Diallyldialkyl ammonium halide | 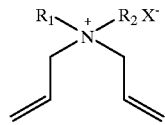 | $R_1$ and $R_2$ = H or 1–20 carbon<br>$X^-$ = $F^-$, $Cl^-$, $Br^-$, $I^-$, $SO4^{2-}$, $PO4^3$ |
| Vinyl sulfonic acid and the salt form | 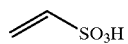 | |
| N-Vinylamides | 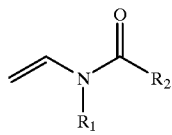 | $R_1$ = H or radical of 1–20 carbon<br>$R_2$ = H (foramide) or radical of 1–50 carbon (acetamide) |

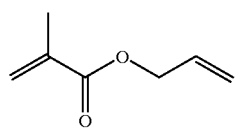
Allyl methacrylate

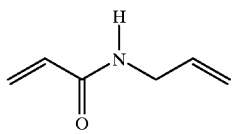
Allyl acrylamide

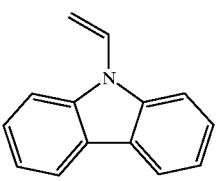
N-vinylcarbazole

| 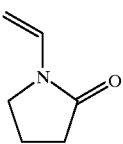 | 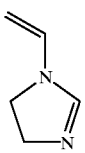 | 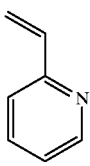 |
|---|---|---|
| N-vinyl pyrrolidone | Vinyl imidazole | Vinyl pyridine |

The polymers herein may optionally comprise copolymers of unsaturated compounds with vinyl monomers such as acrylates and methacrylates. These compounds may display surface active properties. Examples are listed below.

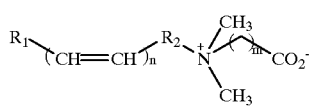

polyunsaturated betaines

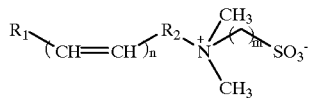

polyunsaturated sulfo-betaines

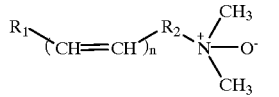

polyunsaturated amine oxides

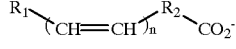

polyunsaturated fatty acids

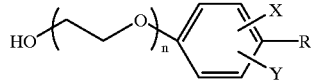

polyethylene oxide alkyl alkyenyl phenol

R1 and R2 = radical of 1–50 carbon
$m$ and $n$ = 1–10 repeat unit
X, Y = H or —CH=CH$_2$
R = radical of 1–50 carbo
$n$ = 1–100 repeat units To improve the mechanical property of the polymers, optional crosslinking monomers may be included in the polymer chains. Examples of bi- and polyfunctional vinyl monomers are showed below.

Polyalkylene (aryl) glycol
diacrylates and dimethacrylates

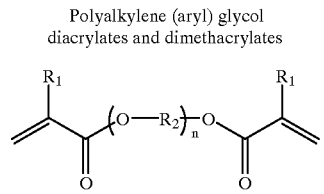

$R_1$ = H (acrylate) or CH$_3$ (methacrylate)
$R_2$ = 1–20 carbon
$n$ = 1–50 repeat units Polyalkylene (aryl) divinyl ethers

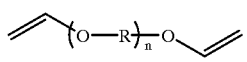

R = 1–20 carbon
$n$ = 1–50 repeat units

Trimethylolpropane triacrylates
and trimethacrylates

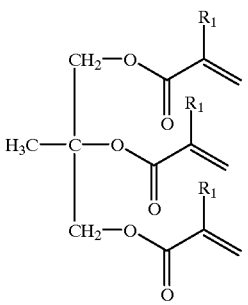

Alkoxylated trimethylolpropane
triacrylate and trimethacrylate

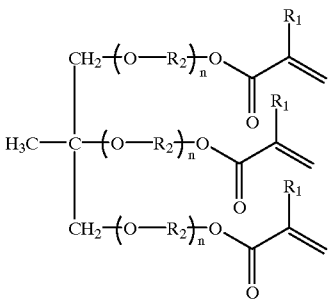

Glyceryl triacrylates
and trimethacrylates

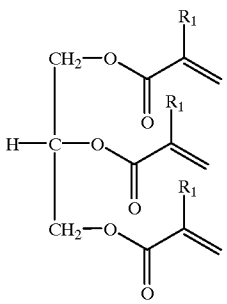

-continued
Alkoxylated glyceryl
triacrylate and trimethacrylate

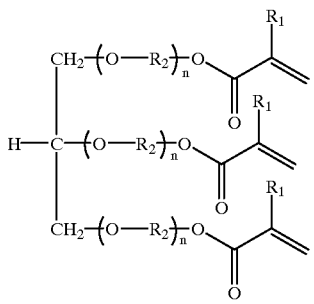

$R_1$ = H (acrylate) or $CH_3$ (methacrylate)
$R_2$ = radical of 1–50 carbon
$n$ = 1–50 repeat units Pentaerythritol tetraacrylate
and tetramethacrylate

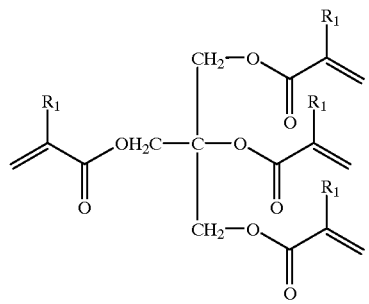

Alkoxylated pentaerythritol
tetraacrylate and tetramethacrylate

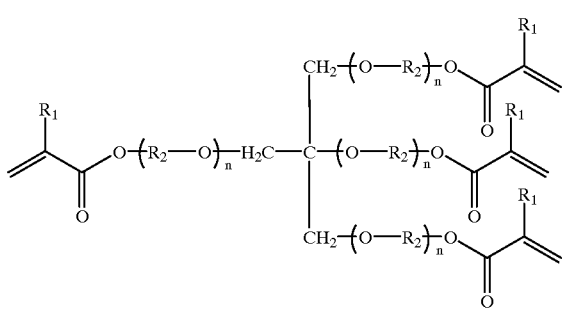

$R_1$ = H (acrylate) or $CH_3$ (methacrylate)
$R_2$ = 1–50 carbon
$n$ = 1–50 repeat units Examples of preferred vinyl monomers for use herein include the following:

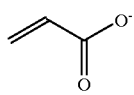

Acrylic acid, $Na^+$ and $K^+$ salt

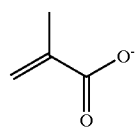

Methacrylic acid, $Na^+$ and $K^+$ salt

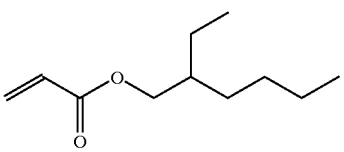

2-Ethyl hexyl acrylate

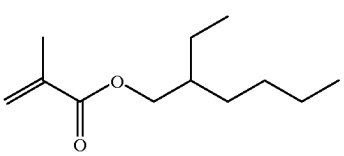

2-Ethyl hexyl methacrylate

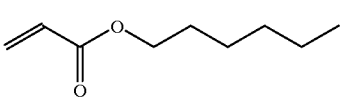

n-Hexyl acrylate

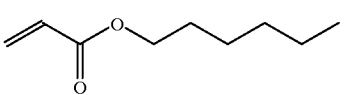

n-Hexyl methacrylate

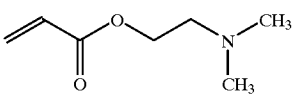

N, N-Dimethylaminoethyl acrylate

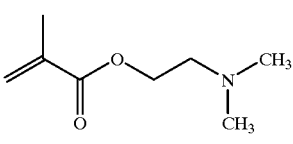

N, N-Dimethylaminoethyl methacrylate

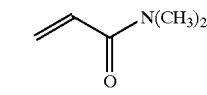

N, N-dimethylamino acrylamide

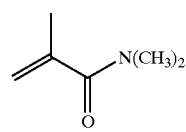

N, N-dimethylamino methacrylamide

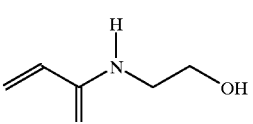

N-Hydroxyethyl acrylate

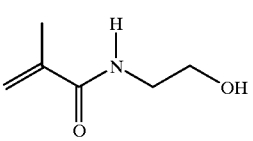

N-Hydroxyethyl methacrylate

-continued

![acrylate-PEG-OMe structure]

Polyethylene glycol 2000
monomethyl ether acrylate

![methacrylate-PEG-OMe structure]

Polyethylene glycol 2000
monomethyl ether methacrylate

![acrylate-PEG-OH structure]

Polyethylene glycol 2000 acrylate

![methacrylate-PEG-OH structure]

Polyethylene glycol 2000 methacrylate

![acrylate-PPG-OMe structure]

Polypropylene glycol 400
monomethyl ether acrylate

![methacrylate-PPG-OMe structure]

Polypropylene glycol 400
monomethyl ether methacrylate

![acrylate-PPG-OH structure]

Polypropylene glycol 400 acrylate

![methacrylate-PPG-OH structure]

Polypropylene glycol 400 methacrylate

![sulfopropyl acrylate structure]

Sulfopropyl acrylate, Na$^+$ and K$^+$ salt

-continued

![sulfopropyl methacrylate structure]

Sulfopropyl methacrylate,
Na$^+$ and K$^+$ salt

![vinyl acetate structure]

Vinyl acetate

![4-styrene sulfonic acid structure]

4-Stryene sulfonic acid,
Na$^+$ and k$^+$ salt

![n-octyl vinyl ether structure]

n-Octyl vinyl ether

![vinyl sulfonic acid structure]

Vinyl sulfonic acid, sodium
and potassium salts

![diallyldimethyl ammonium chloride structure]

Diallyldimethyl ammonim chloride

![N-vinylacetamide structure]

N-Vinylacetamide

![allyl methacrylate structure]

Allyl methacrylate

![N-allyl acrylamide structure]

N-Allyl acrylamide

![N-vinyl pyrrolidone structure]

N-vinyl pyrrolidone

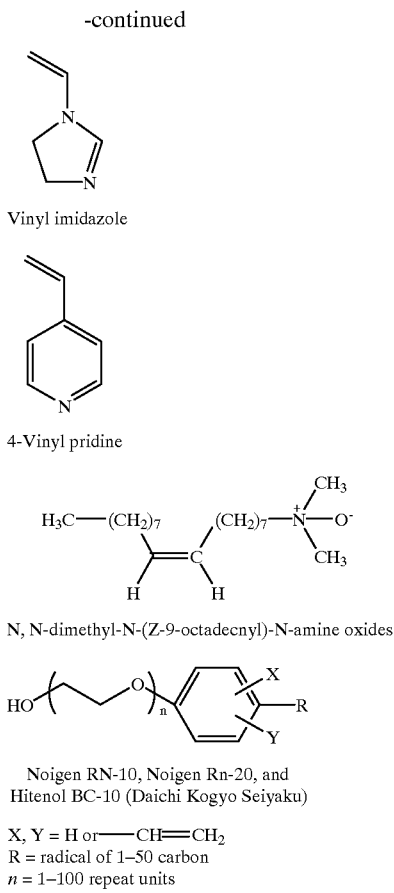

Vinyl imidazole

4-Vinyl pridine

N, N-dimethyl-N-(Z-9-octadecnyl)-N-amine oxides

Noigen RN-10, Noigen Rn-20, and
Hitenol BC-10 (Daichi Kogyo Seiyaku)

X, Y = H or —CH=CH₂
R = radical of 1–50 carbon
$n$ = 1–100 repeat units

Examples of preferred vinyl monomers for crosslinking include the following:

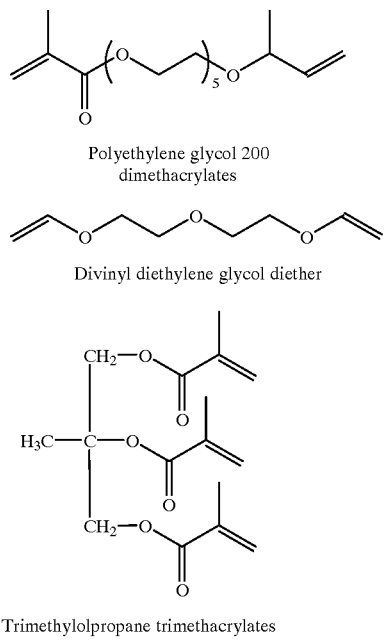

Polyethylene glycol 200 dimethacrylates

Divinyl diethylene glycol diether

Trimethylolpropane trimethacrylates

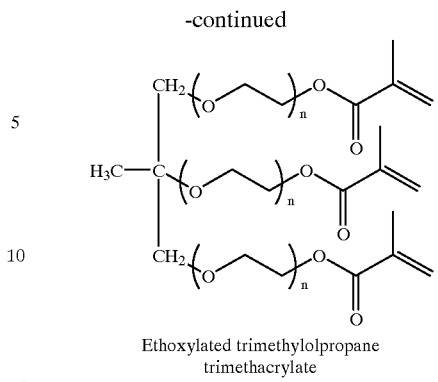

Ethoxylated trimethylolpropane trimethacrylate

It should be noted in the preceding structures that the various carbon chains can refer to saturated or unsaturated hydrocarbons with or without aromatic moieties. Further, a person skilled in the art would recognize that the optimal ratio of a specific monomer, in particular the monomers capable of crosslinking, may affect the performance of the inkjet ink formulations. For instance, use of high levels of the crosslinking monomers may result in gelling of the MMC.

Ink-jet Ink Vehicle—The ink compositions of this invention comprise the modified MMC colorants above plus a vehicle. For a discussion of inks and their properties, see *The Printing Manual*, $5^{th}$ ed. Leach et al. (Chapman and Hall, 1993). See also U.S, Pat. Nos. 2,833,736; 3,607,813; 4,104, 061; 4,770,706; and 5,026,755.

A typical formulation for an ink useful in the practice of the invention includes the MMC (about 0.001 % to 10 wt %), one or more cosolvents (0.01 to about 50 wt %), one or more water-soluble surfactants/amphiphiles (0 to about 40, preferably about 0.1 to about 5 wt %), one or more high molecular weight colloids (0 to about 3 wt %), and water (balance).

One or more cosolvents may be added to the vehicle in the formulation of the ink. Classes of cosolvents employed in the practice of this invention include, but are not restricted to, aliphatic alcohols, aromatic alcohols, diols, glycol ethers, poly(glycol) ethers, caprolactams, formamides, acetamides, and long chain alcohols. Examples of compounds employed in the practice of this invention include, but are not restricted to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl- 1,3-propanediol, diethylene glycol, 3-methoxybutanol, and 1,3-dimethyl-2-imidazolidinone. The cosolvent concentration may range from about 0.01 to about 50 wt %, with about 0.1 to 15 wt % being preferred.

Water-soluble surfactants may be employed in the ink vehicle. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols. Ionic surfactants such as substituted amine oxides are useful in the practice of this invention. U.S. Pat. No. 5,106,416, discloses more fully most of the surfactants listed above. The non-ionic amphiphiles/surfactants are more preferred than the ionic surfactants. Specific examples of amphiphilies/surfactants that are preferably employed in the practice of this invention include iso-hexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %.

To further improve optical density, between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from about 0.1% to about 0.75 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Urarcide™ and Proxel™, and NuoCept™. Chelating agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the MMC colorants disclosed herein. For ink formulation which employee MMCs having carboxylate functionalities, the pH is from about 7 to about 12. For sulfonate or cationic functionalities, the pH ranges from about 3 to about 12, preferably the pH is from about 5 to about 9. The viscosity of the final ink composition is from about 0.8 to about 8 cps, preferably from about 0.9 to about 4 cps.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

Preparation

The MMCs of the present invention are typically prepared in three steps: 1) covalent attachment of the water-solubilizing group on commercially available carbon black pigments; 2) covalent attachment of the reactive group onto the modified pigment; and 3) covalent attachment of polymer or monomer groups to the reactive group. During the synthesis of the MMCs, mixing under high shear maximizes the mixing efficiency. Examples of suitable high shear mixers include attritors, homogenizers, microfluidizers, acute pressure valves, two or three roll mills, and sonicators. See for example the following U.S. Patents for more information about the synthesis of the MMCs herein: 5,707,432; 5,630,868; 5,571,311; and 5,554,739.

INDUSTRIAL APPLICABILITY

The inclusion of the modified MMCs described above is expected to find use in inks employed in ink-jet printing.

What is claimed is:

1. An inkjet composition comprising a macromolecular chromophore comprising at least one water-solubilizing functional group and at least one reactive group, wherein said reactive group is covalently attached to a polymer; and wherein said macromolecular chromophore is formed by the steps of 1) attaching said water-solubilizing functional group to said macromolecular chromophore and subsequently 2) attaching said reactive group to said macromolecular chromophore.

2. An ink composition according to claim 1 wherein said water-solubilizing functional groups are selected from the group consisting of:

a) substituted or unsubstituted aromatic groups having attached ionizable groups;

b) alkyl groups comprising from about 1 to about 12 carbons having attached ionizable groups; and c) mixtures thereof;

and wherein said ionizable groups are selected from the group consisting sulfonic acid, sulfinic acid, phosphonic acid, carboxylic acid, ammonium, quaternary ammonium, phosphonium groups, and mixtures thereof.

3. An ink composition according to claim 2 wherein said water-solubilizing functional groups are selected from the group consisting of:

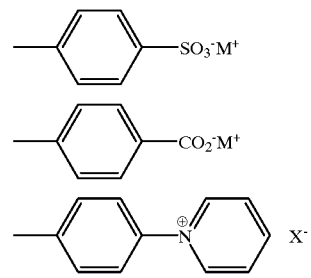

wherein M$^+$ and X$^-$ are counterions.

4. An ink composition according to claim 1 wherein said reactive groups are selected from the group consisting of:

1. Phenyl triazines

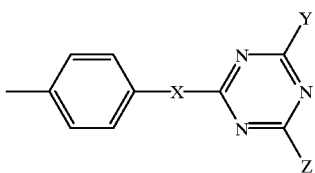

X = O, S, SO₂, NH
Y or Z = H, Cl, F, Br

2. Phenyl 2-(methyl ethyl sulfanato) ether, phenyl 2-(methyl ethyl sulfanato) sulfide, phenyl 2-(methyl ethyl sulfanato) sulfone, N-phenyl-N-2-(methyl sulfanato)ethyl amine

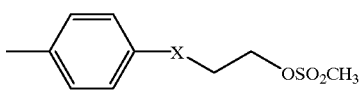

X = O, S, SO₂, NHO

3. Sodium phenyl 2-(ethyl sulfanato) ether, sodium phenyl 2-(ethyl sulfanato) sulfide, sodium phenyl 2-(ethyl sulfanato) sulfone, N-phenyl-2-(ethyl sulfanato)ethyl amine

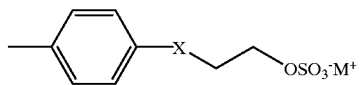

X = O, S, SO₂, NHO
M⁺ = Na⁺, K⁺, NH₄⁺, (CH₃)₂NH₂⁺, (CH₃)₄N⁺, (C₄H₉)₄N⁺, (C₃H₇)₄N⁺, etc 4. Chloromethyl (ethyl) phenyl sulfone, 2,2-dichloroethyl phenyl sulfone

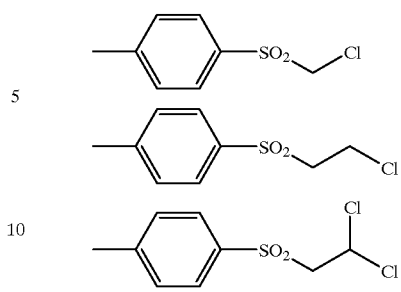

5. Phenyl vinyl sulfone

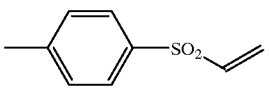

6. N-Phenyl vinyl amide, phenyl-(2-chloroethyl)amide, amino 2-ethyl chloride

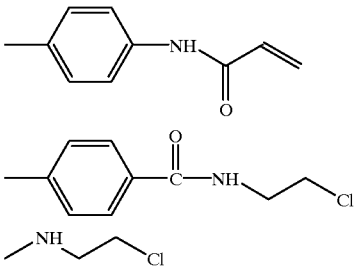

and mixtures thereof.

5. An ink composition according to claim 4 wherein said water-soluble functional groups and said reactive groups comprise from about 0.001 mmol/g to about 10 mmol/g of said macromolecular chromophore.

6. An ink composition according to claim 1 wherein said reactive groups are further attached to polymers, wherein said polymers is obtained from monomers selected from the group consisting of

| | | |
|---|---|---|
| Acrylic and methacrylic acids, and the salt form | 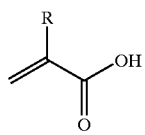 | R = H (acrylic acid) or CH₃ (methacrylic acid) |
| Esters of acrylic and methacrylic acids | 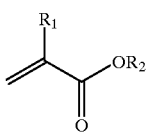 | $R_1$ = H (acrylic acid) or CH₃ (methacrylic acid)<br>$R_2$ = radical of 1–50 carbon |
| Amides of acrylic acid | 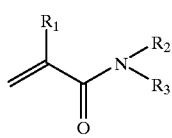 | $R_1$ = H (acrylic acid) or CH₃ (methacrylic acid)<br>$R_2$ and $R_3$ = H or radical of 1–50 carbon |

-continued

| | | |
|---|---|---|
| Hydroxy amides of acrylic and methacrylic acids | 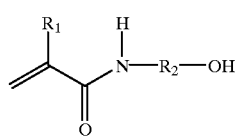 | $R_1$ = H (acrylic acid) or $CH_3$ (methacrylic acid)<br>$R_2$ = radical of 1–50 carbon |
| Polyethylene glycols and ethers of acrylic acid | 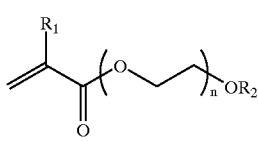 | $R_1$ = H (acrylic acid) or $CH_3$ (methacrylic acid)<br>$R_2$ = H or radical of 1–50 carbon<br>n = 1–100 repeat units |
| Polyalkylene glycols and ethers of acrylic acid | 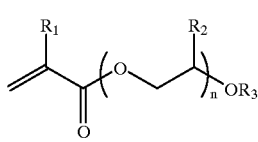 | $R_1$ = H (acrylic acid) or $CH_3$ (methacrylic acid)<br>$R_2$ = radical of 1–50 carbon<br>$R_3$ = H or radical of 1–50 carbon<br>n = 1–100 repeat units |
| Vinyl ether | 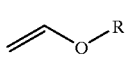 | R = radical of 1–50 carbon |
| Diallyldialkyl ammonium halide | 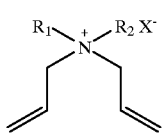 | $R_1$ and $R_2$ = H or 1–20 carbon<br>$X^-$ = $F^-$, $Cl^-$, $Br^-$, $I^-$, $SO_4^{2-}$, $PO_4^{3-}$ |
| Vinyl sulfonic acid and the salt form | 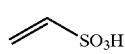 | |
| N-Vinylamides | 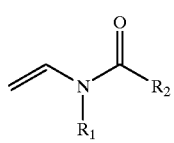 | $R_1$ = H or radical of 1–20 carbon<br>$R_2$ = H (foramide) or radical of 1–50 carbon (acetamide) |

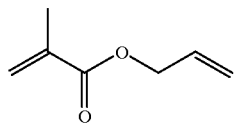

Allyl methacrylate

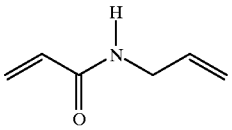

Allyl acrylamide

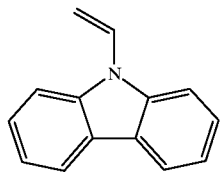

N-vinylcarbazole

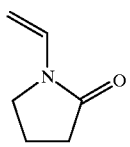

N-vinyl pyrrolidone

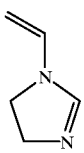

Vinyl imidazole

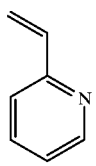

Vinyl pyridine

| | | |
|---|---|---|
| Sulfoalkyl(aryl) acrylate and methacrylate, and their salt form | 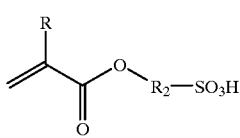 | $R_1$ = H (acrylate), or $CH_3$ (methacrylate)<br>$R_2$ = radical of 1–50 carbon |

-continued

Stryene and its derivatives

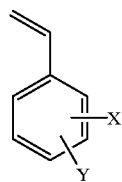

X and Y = H, $NH_2$, $SO_3H$, $OCH_3$ or radical of 1–20 carbon

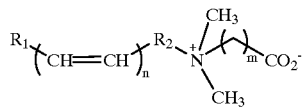

polyunsaturated betaines

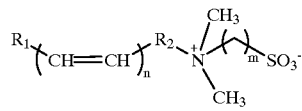

polyunsaturated sulfo-betaines

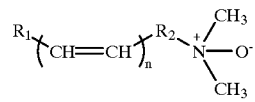

polyunsaturated amine oxides

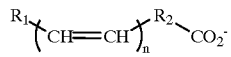

polyunsaturated fatty acids $R_1$ and $R_2$ = radical of 1–50 carbon
m and n = 1–10 repeat unit

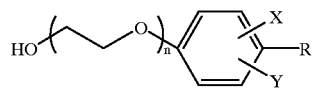

X, Y = H or $-CH=CH_2$
R = radical of 1–50 carbon
n = 1–100 repeat units polyethylene oxide alkyl alkyenyl phenol Polyalkylene (aryl) glycol diacrylates and dimethacrylates

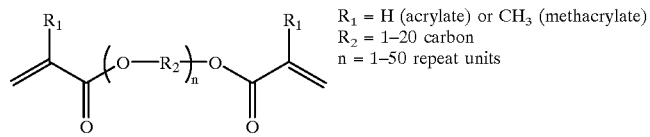

$R_1$ = H (acrylate) or $CH_3$ (methacrylate)
$R_2$ = 1–20 carbon
n = 1–50 repeat units Polyalkylene (aryl) divinyl ethers

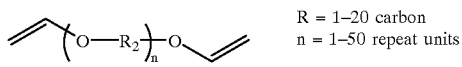

R = 1–20 carbon
n = 1–50 repeat units

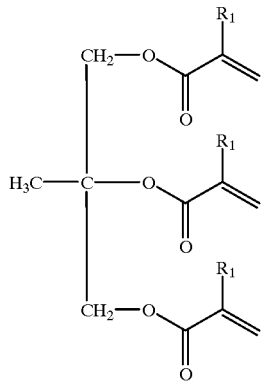

Trimethylolpropane triacrylates and trimethacrylates

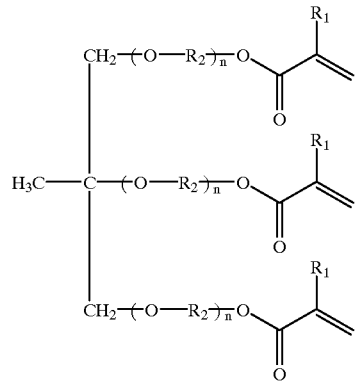

Alkoxylated trimethylolpropane triacrylate and trimethacrylate

-continued

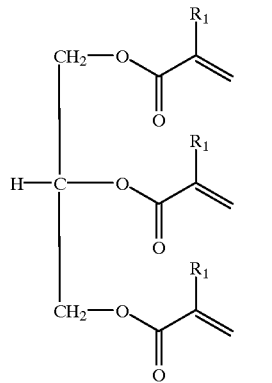

Glyceryl triacrylates
and trimethacrylates

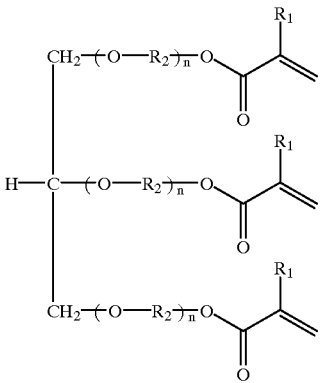

Alkoxylated glyceryl
triacrylate and trimethacrylate $R_1$ = H (acrylate) or $CH_3$ (methacrylate)
$R_2$ = radical of 1–50 carbon
n = 1–50 repeat units and mixtures thereof.

7. An ink composition according to claim 1 wherein said reactive groups are attached to polymers, said polymers is obtained from monomers selected from the group consisting of:

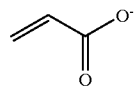

Acrylic acid, $Na^+$ and $K^+$ salt

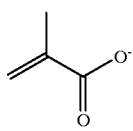

Methacrylic acid, $Na^+$ and $K^+$ salt

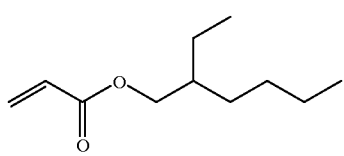

2-Ethyl hexyl acrylate

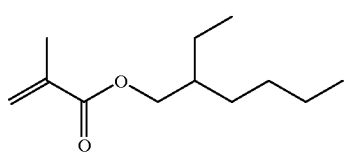

2-Ethyl hexyl methacrylate

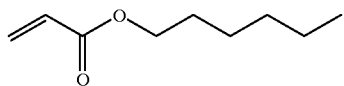

n-Hexyl acrylate

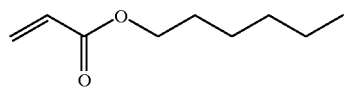

n-Hexyl methacrylate

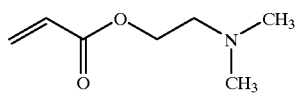

N,N-Dimethylaminoethyl acrylate

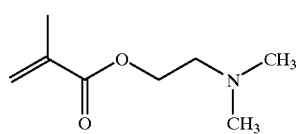

N,N-Dimethylaminoethyl methacrylate

-continued

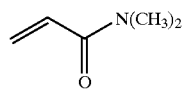

N,N-dimethylamino acrylamide

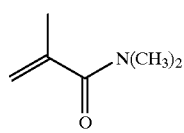

N,N-dimethylamino methacrylamide

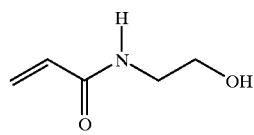

N-Hydroxyethyl acrylate

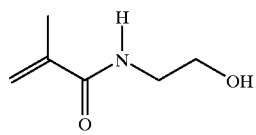

N-Hydroxyethyl methacrylate

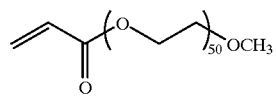

Polyethylene glycol 2000 monomethyl ether acrylate

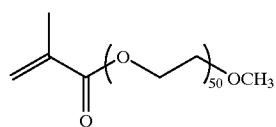

Polyethylene glycol 2000 monomethyl ether methacrylate

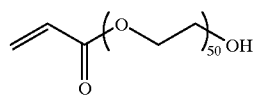

Polyethylene glycol 2000 acrylate

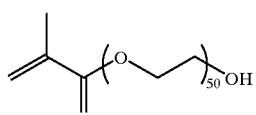

Polyethylene glycol 2000 methacrylate

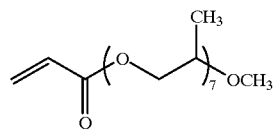

Polypropylene glycol 400 monomethyl ether acrylate

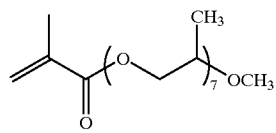

Polypropylene glycol 400 monomethyl ether methacrylate

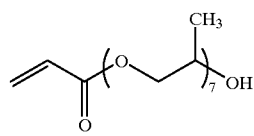

Polypropylene glycol 400 acrylate

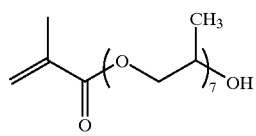

Polypropylene glycol 400 methacrylate

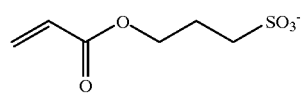

Sulfopropyl acrylate, $Na^+$ and $K^+$ salt

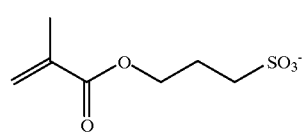

Sulfopropyl methacrylate, $Na^+$ and $K^+$ salt

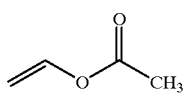

Vinyl acetate

4-Stryene sulfonic acid, $Na^+$ and $K^+$ salt

-continued

| | | |
|---|---|---|
| 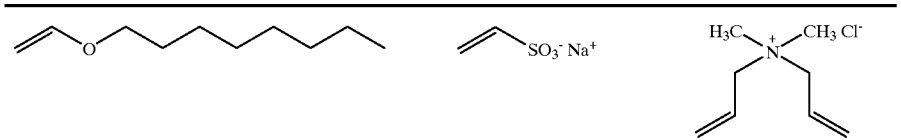 | | |
| n-Octyl vinyl ether | Vinyl sulfonic acid, sodium and potassium salts | Diallyldimethyl ammonium chloride |
| 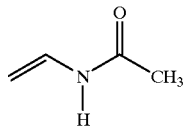 | 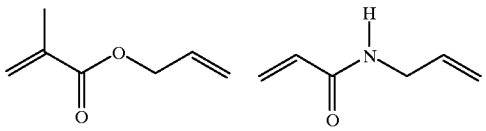 | |
| N-Vinylacetamide | Allyl methacrylate | N-Allyl acrylamide |
| 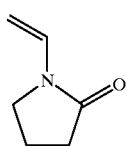 | 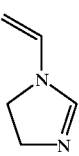 | 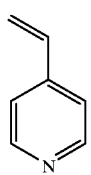 |
| N-vinyl pyrrolidone | Vinyl imidazole | 4-Vinyl pyridine |

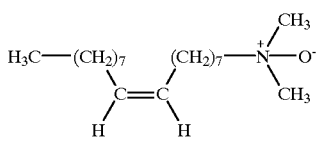

N,N-dimethyl-N-(Z-9-octadecnyl)-N-amine oxides

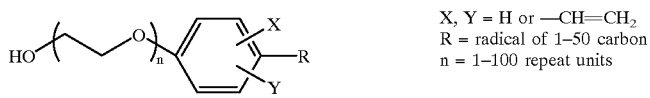

X, Y = H or —CH=CH$_2$
R = radical of 1–50 carbon
n = 1–100 repeat units

| 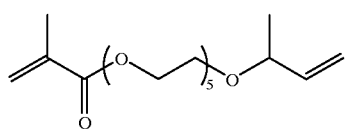 | 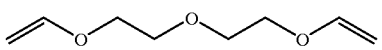 |
|---|---|
| Polyethylene glycol 200 dimethacrylates | Divinyl diethylene glycol diether |
| 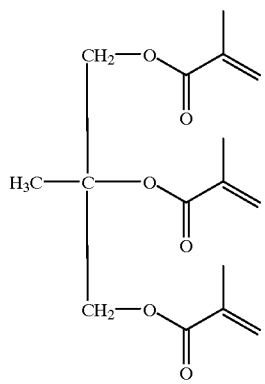 | 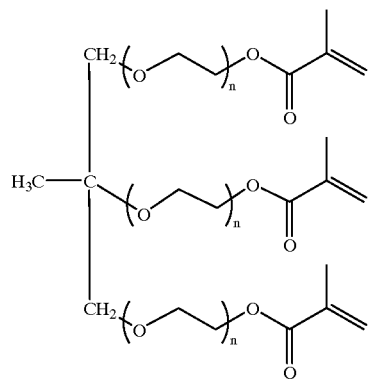 |
| Trimethylolpropane trimethacrylates | Ethoxylated trimethylolpropane trimethacrylate | and mixtures thereof.

8. An ink composition for use in ink-jet printing comprising:

a) from about 0.001% to about 10 wt % of a macromolecular chromophore comprising at least one water-solubilizing functional group and at least one reactive group, wherein at least one covalently attached polymer is attached to said reactive group; and wherein said macromolecular chromophore is formed by the steps of 1) attaching said water-solubilizing functional group to said macromolecular chromophore and subsequently 2) attaching said reactive group to said macromolecular chromophore;

b) from about 0.01% to about 50 wt % of one or more cosolvents;

c) from 0% to about 40 wt % of one or more water-soluble surfactants/amphiphiles; and d) from 0% to about 3 wt % of one or more high molecular weight colloid.

9. An ink composition according to claim 8 wherein said water-solubilizing functional groups are selected from the group consisting of:

a) substituted or unsubstituted aromatic groups having attached ionizable groups;

b) alkyl groups comprising from about 1 to about 12 carbons having attached ionizable groups; and c) mixtures thereof; and wherein said ionizable groups are selected from the group consisting sulfonic acid, sulfinic acid, phosphonic acid, carboxylic acid, ammonium, quaternary ammonium, phosphonium groups, and mixtures thereof.

10. An ink composition according to claim 9 wherein said water-solubilizing functional groups are selected from the group consisting of:

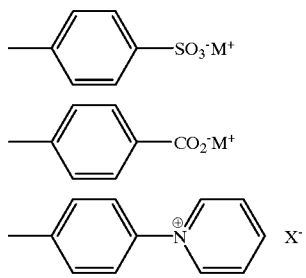

wherein $M^+$ and $X^-$ are counterions.

11. An ink composition according to claim 10 wherein said ink composition has a pH of from about 8 to about 10.

12. An ink composition according to claim 9 wherein said water-soluble functional groups and said reactive groups comprise from about 0.001 mmol/g to about 10 mmol/g of said macromolecular chromophore.

13. An ink composition according to claim 8 wherein said reactive groups are selected from the group consisting of:

1. Phenyl triazines

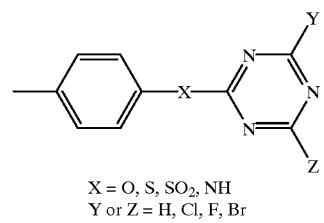

$X = O, S, SO_2, NH$
$Y \text{ or } Z = H, Cl, F, Br$

2. Phenyl 2-(methyl ethyl sulfanato) ether, phenyl 2-(methyl ethyl sulfanato) sulfide, phenyl 2-(methyl ethyl sulfanato) sulfone, N-phenyl-N-2-(methyl sulfanato)ethyl amine

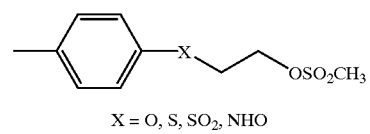

$X = O, S, SO_2, NHO$

3. Sodium phenyl 2-(ethyl sulfanato) ether, sodium phenyl 2-(ethyl sulfanato) sulfide, sodium phenyl 2-(ethyl sulfanato) sulfone, N-phenyl-2-(ethyl sulfanato)ethyl amine

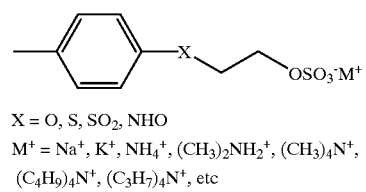

$X = O, S, SO_2, NHO$
$M^+ = Na^+, K^+, NH_4^+, (CH_3)_2NH_2^+, (CH_3)_4N^+,$
$(C_4H_9)_4N^+, (C_3H_7)_4N^+, \text{etc}$ 4. Chloromethyl (ethyl) phenyl sulfone, 2,2-dichloroethyl phenyl sulfone

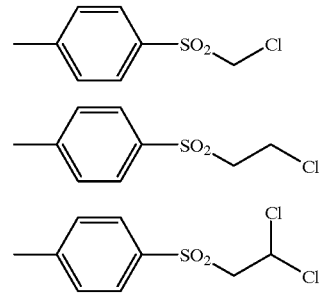

5. Phenyl vinyl sulfone

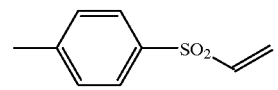

6. N-Phenyl vinyl amide, phenyl-(2-chloroethyl)amide, amino 2-ethyl chloride

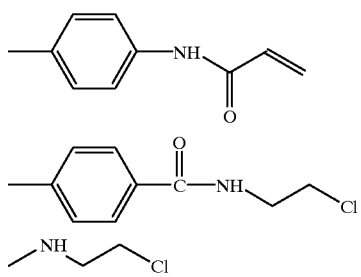

and mixtures thereof.

14. A method of ink-jet printing comprising printing on a medium an ink-jet ink composition comprising a macromolecular chromophore comprising at least one water-solubilizing functional group and at least one covalently attached reactive group and wherein said reactive group is covalently attached to a polymer; and wherein said macromolecular chromophore is formed by the steps of 1) attaching said water solubilizing functional group to said macromolecular chromophore and subsequently 2) attaching said reactive group to said macromolecular chromophore.

15. A method of ink-jet printing according to claim 14 wherein said water-solubilizing functional groups are selected from the group consisting of:

a) substituted or unsubstituted aromatic groups having attached ionizable groups;
b) alkyl groups comprising from about 1 to about 12 carbons having attached ionizable groups; and
c) mixtures thereof;

and wherein said ionizable groups are selected from the group consisting sulfonic acid, sulfinic acid, phosphonic acid, carboxylic acid, ammonium, quaternary ammonium, phosphonium groups, and mixtures thereof.

16. A method of ink-ink printing according to claim 15 wherein said water-solubilizing functional groups are selected from the group consisting of:

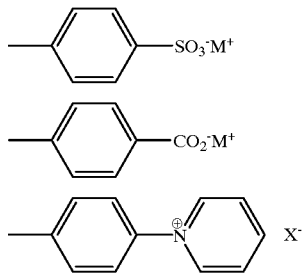

and mixtures thereof.

17. A method for inkjet printing according to claim 14 wherein said reactive groups are selected from the group consisting of:

1. Phenyl triazines

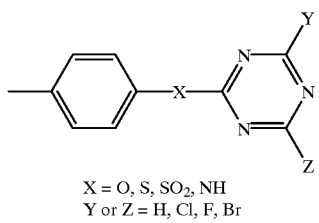

X = O, S, SO$_2$, NH
Y or Z = H, Cl, F, Br

2. Phenyl 2-(methyl ethyl sulfanato) ether, phenyl 2-(methyl ethyl sulfanato) sulfide, phenyl 2-(methyl ethyl sulfanato) sulfone, N-phenyl-N-2-(methyl sulfanato)ethyl amine

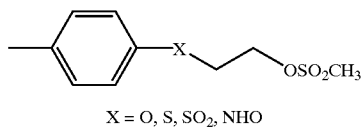

X = O, S, SO$_2$, NHO

3. Sodium phenyl 2-(ethyl sulfanato) ether, sodium phenyl 2-(ethyl sulfanato) sulfide, sodium phenyl 2-(ethyl sulfanato) sulfone, N-phenyl-2-(ethyl sulfanato)ethyl amine

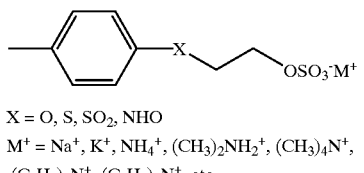

X = O, S, SO$_2$, NHO
M$^+$ = Na$^+$, K$^+$, NH$_4^+$, (CH$_3$)$_2$NH$_2^+$, (CH$_3$)$_4$N$^+$, (C$_4$H$_9$)$_4$N$^+$, (C$_3$H$_7$)$_4$N$^+$, etc 4. Chloromethyl (ethyl) phenyl sulfone, 2,2-dichloroethyl phenyl sulfone

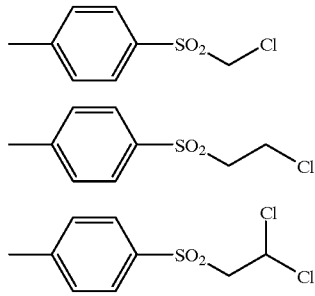

5. Phenyl vinyl sulfone

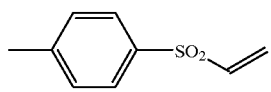

6. N-Phenyl vinyl amide, phenyl-(2-chloroethyl)amide, amino 2-ethyl chloride

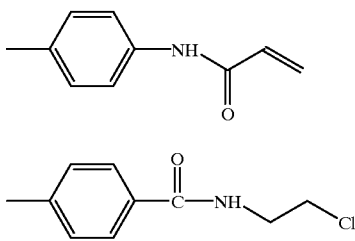

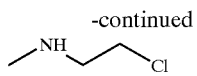

and mixtures thereof.

18. A method of ink-jet printing according to claim 17 wherein said water-soluble functional groups and said reactive groups comprise from about 0.001 mmol/g to about 10 mmol/g of said macromolecular chromophore.

19. A method according to claim 18 wherein said polymer attached to said reactive groups is obtained from monomers selected from the group consisting of:

| | | |
|---|---|---|
| Acrylic and methacrylic acids, and the salt form | 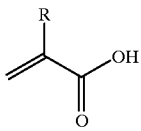 | R = H (acrylic acid) or CH3 (methacrylic acid) |
| Esters of acrylic and methacrylic acids | 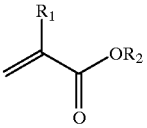 | $R_1$ = H (acrylic acid) or $CH_3$ (methacrylic acid)<br>$R_2$ = radical of 1–50 carbon |
| Amides of acrylic acid | 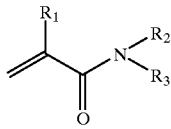 | $R_1$ = H (acrylic acid) or $CH_3$ (methacrylic acid)<br>$R_2$ and $R_3$ = H or radical of 1–50 carbon |
| Hydroxy amides of acrylic and methacrylic acids | 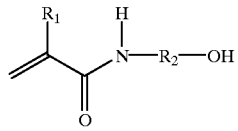 | $R_1$ = H (acrylic acid) or $CH_3$ (methacrylic acid)<br>$R_2$ = radical of 1–50 carbon |
| Polyethylene glycols and ethers of acrylic acid | 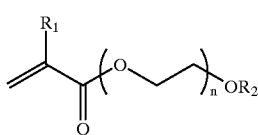 | $R_1$ = H (acrylic acid) or $CH_3$ (methacrylic acid)<br>$R_2$ = H or radical of 1–50 carbon<br>n = 1–100 repeat units |
| Polyalkylene glycols and ethers of acrylic acid | 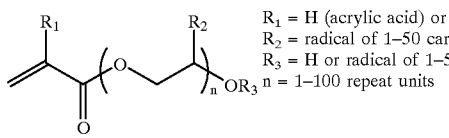 | $R_1$ = H (acrylic acid) or $CH_3$ (methacrylic acid)<br>$R_2$ = radical of 1–50 carbon<br>$R_3$ = H or radical of 1–50 carbon<br>n = 1–100 repeat units | and mixtures thereof.

20. A method according to claim 18 wherein said polymer attached to said reactive groups is obtained from monomers selected from the group consisting of:

| | | |
|---|---|---|
| Sulfoalkyl(aryl) acrylate and methacrylate, and their salt form | 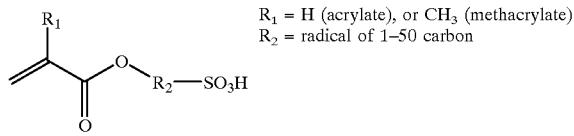 | $R_1$ = H (acrylate), or $CH_3$ (methacrylate) <br> $R_2$ = radical of 1–50 carbon |
| Stryene and its derivatives | 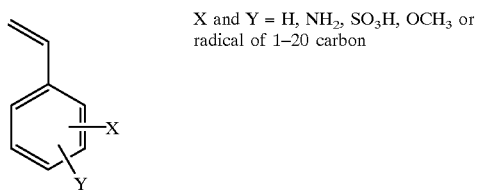 | X and Y = H, $NH_2$, $SO_3H$, $OCH_3$ or radical of 1–20 carbon |
| Vinyl ether | 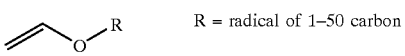 | R = radical of 1–50 carbon |
| Diallyldialkyl ammonium halide | 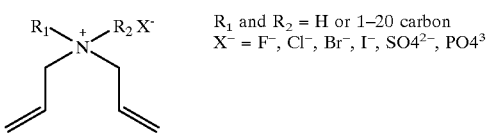 | $R_1$ and $R_2$ = H or 1–20 carbon <br> $X^-$ = $F^-$, $Cl^-$, $Br^-$, $I^-$, $SO4^{2-}$, $PO4^3$ | and mixtures thereof.

21. A method according to claim 18 wherein said polymer attached to said reactive groups is obtained from monomers selected from the group consisting of:

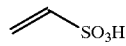

Vinyl sulfonic acid and the salt form

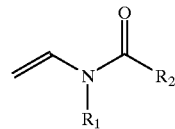

$R_1$ = H or radical of 1–20 carbon
$R_2$ = H (foramide) or radical of 1–50 carbon (acetamide)

N-Vinylamides

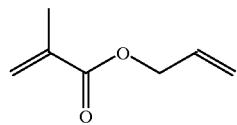

Allyl methacrylate

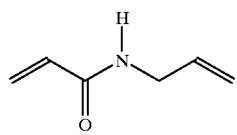

Allyl acrylamide

-continued

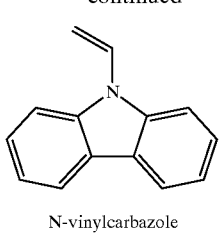

N-vinylcarbazole

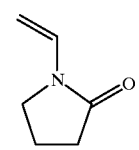

N-vinyl pyrrolidone

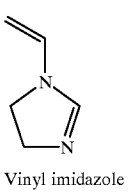

Vinyl imidazole

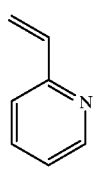

Vinyl pridine

-continued polyethylene oxide alkyl alkyenyl phenol

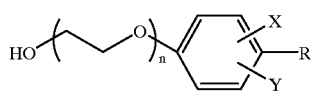

X, Y = H or —CH=CH$_2$
R = radical of 1–50 carbon
n = 1–100 repeat units

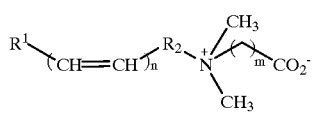

polyunsaturated betaines

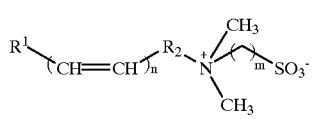

polyunsaturated sulfo-betaines

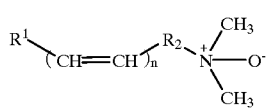

polyunsaturated amine oxides

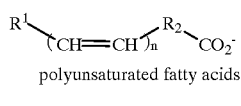

polyunsaturated fatty acids

R1 and R2 = radical of 1–50 carbon
m and n = 1–10 repeat unit

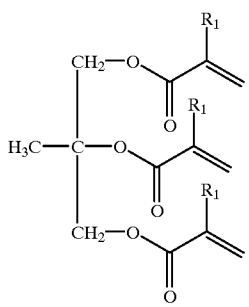

Trimethylolpropane triacrylates
and trimethacrylates

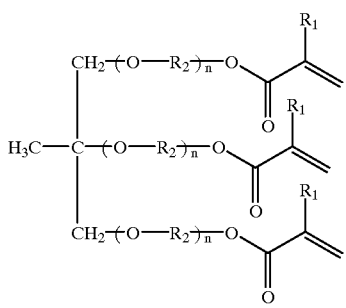

Alkoxylated trimethylolpropane
triacrylate and trimethacrylate

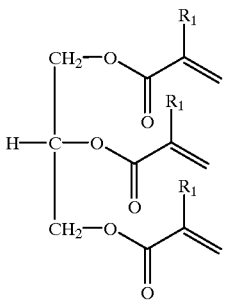

Glyceryl triacrylates
and trimethacrylates

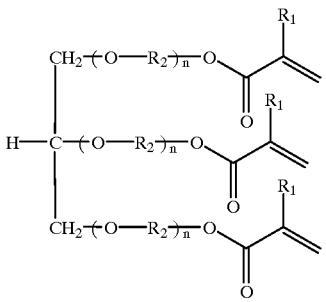

Alkoxylated glyceryl
triacrylate and trimethacrylate $R_1$ = H (acrylate) or CH$_3$ (methacrylate)
$R_2$ = radical of 1–50 carbon
n = 1–50 repeat units Polyalkylene (aryl) glycol
diacrylates and dimethacrylates

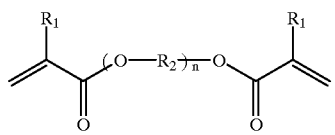

$R_1$ = H (acrylate) or CH$_3$ (methacrylate)
$R_2$ = 1–20 carbon
n = 1–50 repeat units Polyalkylene (aryl) divinyl ethers

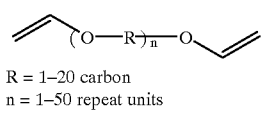

R = 1–20 carbon
n = 1–50 repeat units

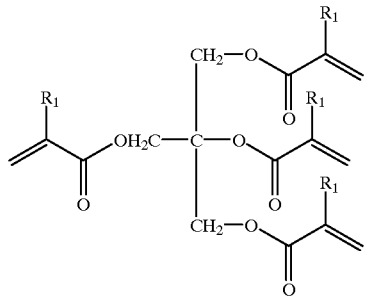

Pentaerythritol tetraacrylate
and tetramethacrylate

-continued

Alkoxylated pentaerythritol tetraacrylate and tetramethacrylate
$R_1$ = H (acrylate) or $CH_3$ (methacrylate)
$R_2$ = 1–50 carbon
n = 1–50 repeat units and mixtures thereof.

22. A method according to claim 18 wherein said polymers is obtained from monomers selected from the group consisting of Acrylic acid, $Na^+$ and $K^+$ salt Methacrylic acid, $Na^+$ and $K^+$ salt 2-Ethyl hexyl acrylate 2-Ethyl hexyl methacrylate n-Hexyl acrylate n-Hexyl methacrylate N,N-Dimethylaminoethyl acrylate N,N-Dimethylaminoethyl methacrylate N,N-dimethylamino acrylamide N,N-dimethylamino methacrylamide N-Hydroxyethyl acrylate N-Hydroxyethyl methacrylate Polyethylene glycol 2000 monomethyl ether acrylate Polyethylene glycol 2000 monomethyl ether methacrylate Polyethylene glycol 2000 acrylate Polyethylene glycol 2000 methacrylate Polypropylene glycol 400 monomethyl ether acrylate -continued

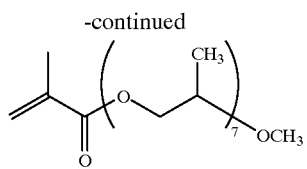
Polypropylene glycol 400 monomethyl ether methacrylate

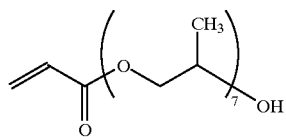
Polypropylene glycol 400 acrylate

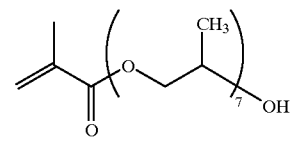
Polypropylene glycol 400 methacrylate

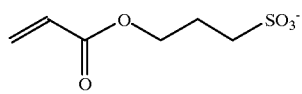
Sulfopropyl acrylate, Na+ and K+ salt

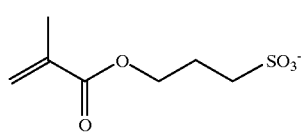
Sulfopropyl methacrylate, Na+ and K+ salt

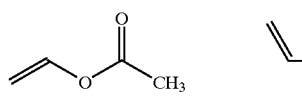
Vinyl acetate

4-Stryene sulfonic acid, Na+ and k+ salt

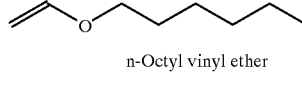
n-Octyl vinyl ether

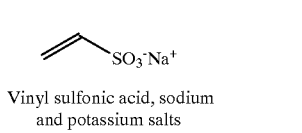
Vinyl sulfonic acid, sodium and potassium salts

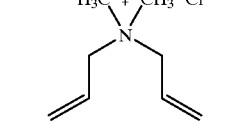
Diallyldimethyl ammonim chloride

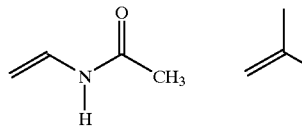
N-Vinylacetamide

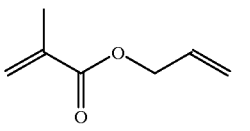
Allyl methacrylate

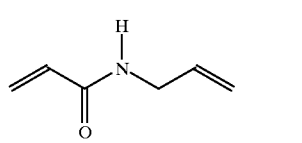
N-Allyl acrylamide

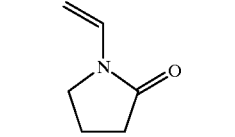
N-vinyl pyrrolidone

-continued

Vinyl imidazole

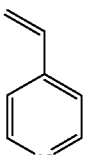
4-Vinyl pyridine

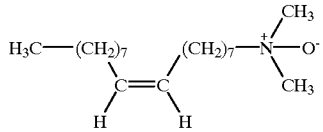
N, N-dimethyl-N-(Z-9-octadecnyl)-N-amine oxides

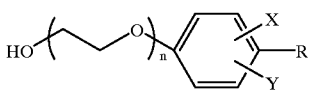
X, Y = H or —CH=CH$_2$
R = radical of 1–50 carbon
$n$ = 1–100 repeat units

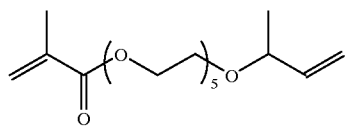
Polyethylene glycol 200 dimethacrylates

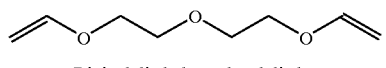
Divinyl diethylene glycol diether

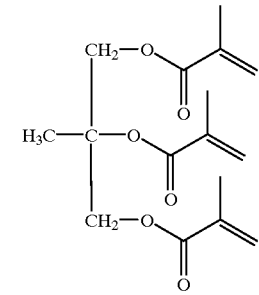
Trimethylolpropane trimethacrylates

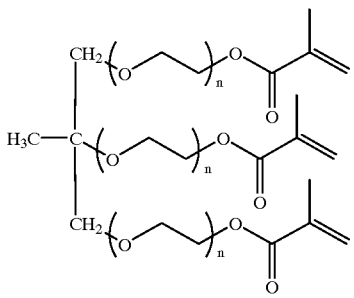
Ethoxylated trimethylolpropane trimethacrylate and mixtures thereof.

23. A method of ink-jet printing comprising printing on a medium an ink composition comprising:
   a) from about 0.001% to about 10 wt % of a macromolecular chromophore comprising at least one water-solubilizing functional group and at least one reactive group having covalently attached polymers thereto; and wherein said macromolecular chromophore is formed by the steps of 1) attaching said water-solubilizing functional group to said macromolecular chromophore and subsequently 2) attaching said reactive group to said macromolecular chromophore;
b) from about 0.01% to about 50 wt % of one or more cosolvents;
c) from 0% to about 40 wt % of one or more water-soluble surfactants/amphiphiles; and
d) from 0% to about 3 wt % of one or more high molecular weight colloid.

24. A method according to claim 23 wherein said ink composition has a pH of from about 8 to about 10.

25. A method of ink-jet printing comprising printing on a cellulose or textile material an ink composition comprising:
a) from about 0.001% to about 10 wt % of a macromolecular chromophore comprising at least one water-solubilizing functional group and at least one reactive group wherein said reactive group is covalently attached to a polymer; and wherein said macromolecular chromophore is formed by the steps of 1) attaching said water-solubilizing functional group to said macromolecular chromophore and subsequently 2) attaching said reactive group to said macromolecular chromophore;
b) from about 0.01% to about 50 wt % of one or more cosolvents;
c) from 0% to about 40 wt % of one or more water-soluble surfactants/amphiphiles; and
d) from 0% to about 3 wt % of one or more high molecular weight colloid.

26. A method for ink-jet printing according to claim 25 wherein said reactive groups are selected from the group consisting of:

1. Phenyl triazines

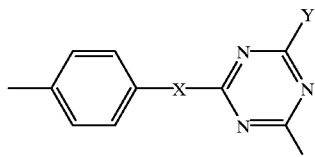

X = O, S, SO$_2$, NH
Y or Z = H, Cl, F, Br

2. Phenyl 2-(methyl ethyl sulfanato) ether, phenyl 2-(methyl ethyl sulfanato) sulfide, phenyl 2-(methyl ethyl sulfanato) sulfone, N-phenyl-N-2-(methyl sulfanato)ethyl amine

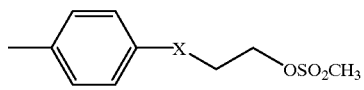

X = O, S, SO$_2$, NHO

3. Sodium phenyl 2-(ethyl sulfanato) ether, sodium phenyl 2-(ethyl sulfanato) sulfide, sodium phenyl 2-(ethyl sulfanato) sulfone, N-phenyl-2-(ethyl sulfanato)ethyl amine

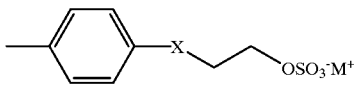

X = O, S, SO$_2$, NHO
M$^+$ = Na$^+$, K$^+$, NH$_4^+$, (CH$_3$)$_2$NH$_2^+$, (CH$_3$)$_4$N$^+$,
(C$_4$H$_9$)$_4$N$^+$, (C$_3$H$_7$)$_4$N$^+$, etc 4. Chloromethyl (ethyl) phenyl sulfone, 2,2-dichloroethyl phenyl sulfone

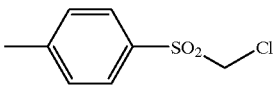

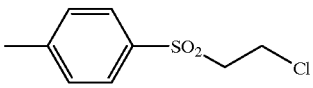

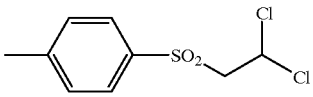

5. Phenyl vinyl sulfone

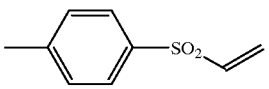

6. N-Phenyl vinyl amide, phenyl-(2-chloroethyl)amide, amino 2-ethyl chloride

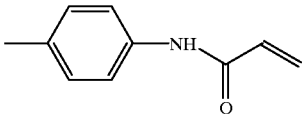

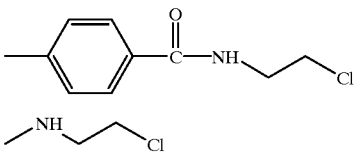

and mixtures thereof.

* * * * *

UNITED STATES PATENT AND TRADEMARK OFFICE
CERTIFICATE OF CORRECTION

PATENT NO. : 6,323,257 B1
DATED : November 27, 2001
INVENTOR(S) : Moffatt et al.

It is certified that error appears in the above-identified patent and that said Letters Patent is hereby corrected as shown below:

Column 33,
Line 45, "ink-ink" should read -- ink-jet --.

Signed and Sealed this

Twenty-fifth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,323,257 B1
DATED : November 27, 2001
INVENTOR(S) : Moffatt et al

It is certified that error appears in the above-identified patent and that said Letters Patent is hereby corrected as shown below:

Title page,
Item [74], *Attorney, Agent, or Firm-* "Micheal D. JOnes" should read
-- Michael D. Jones --;
Item [56], References Cited, insert,
-- FOREIGN PATENT DOCUMENTS
JP      54005490      1/1979 --.

Signed and Sealed this

Seventh Day of September, 2004

JON W. DUDAS
*Director of the United States Patent and Trademark Office*